Patented Aug. 6, 1929.

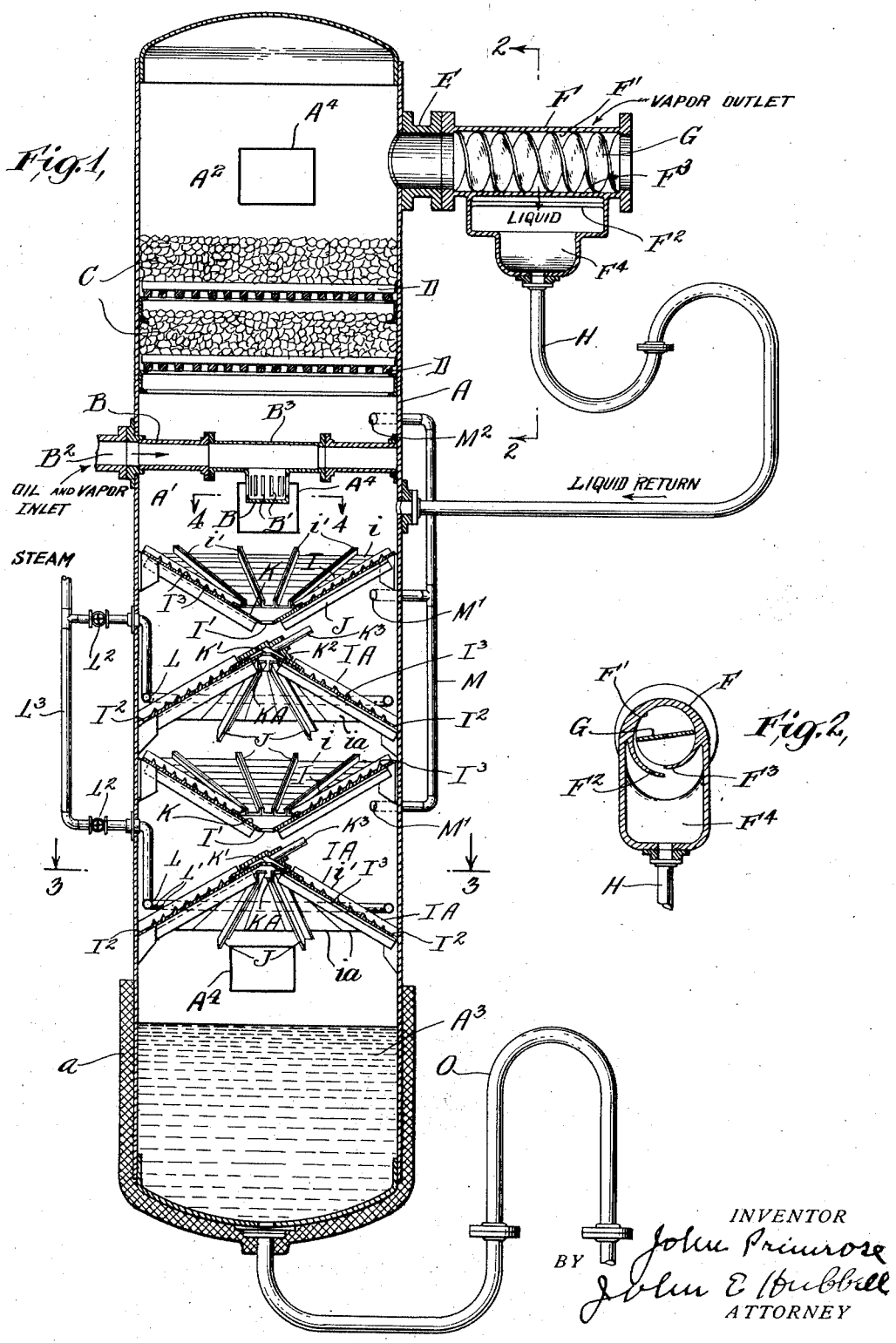

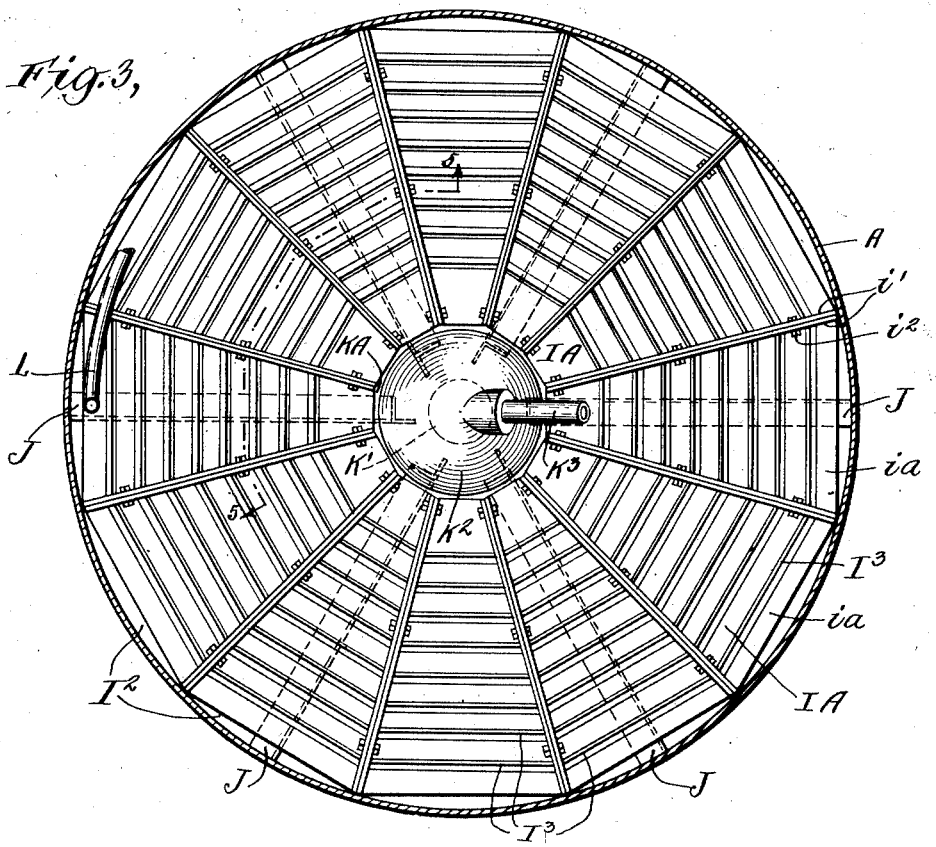
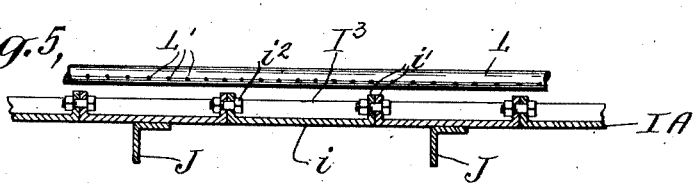
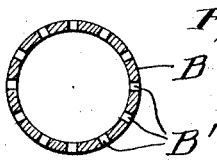

1,723,748

UNITED STATES PATENT OFFICE.

JOHN PRIMROSE, OF RICHMOND, NEW YORK, ASSIGNOR TO FOSTER WHEELER CORPORATION, OF NEW YORK, N. Y., A CORPORATION OF NEW YORK.

METHOD OF AND APPARATUS FOR SEPARATING OIL AND OIL VAPORS.

Application filed May 8, 1923. Serial No. 637,416.

The general object of my present invention is to provide an improved method of, and apparatus for separating liquid and vapor, especially adapted for use in separating oil and oil vapor from the hot mixture of oil and vapor coming from the stills or heaters of oil refining apparatus of various types.

The various features of novelty which characterize my invention are pointed out with particularity in the claims annexed to and forming a part of this specification. For a better understanding of the invention, however, and its advantages, reference should be had to the accompanying drawings and descriptive matter in which I have illustrated and described a preferred embodiment of my invention.

Of the drawings:

Fig. 1 is a sectional elevation;

Fig. 2 is a section on the line 2—2 of Fig. 1;

Fig. 3 is a section on the line 3—3 of Fig. 1;

Fig. 4 is a section on the line 4—4 of Fig. 1; and

Fig. 5 is a developed section on the broken line 5—5 of Fig. 3.

The apparatus shown in the drawings comprises a separating tower A of circular cross section and formed of plate metal. To prevent heat loss and fluctuations in temperature due to changes in external atmospheric conditions the entire tower is preferably encased in suitable insulation shown in part at $a$. The mixture of oil and oil vapor to be separated into its liquid and vapor constituents, is passed into an open chamber portion A' of the tower A, through an external supply pipe $B^2$ and a distributor B which is shown as a hollow vertical cylinder centrally disposed within the tower, and provided with vertical discharge slots or orifices B' through which the oil and vapor is discharged in flat radial jets against the inner wall of the tower proper. As shown the distributing cylinder B is in the form of a hollow boss formed at the underside of a section of a pipe $B^3$ extending diametrically across the tower, and connected at one end to the supply pipe $B^2$. The lower end of the distributor B is closed, but at its upper end the distributor is in free communication with the pipe section $B^3$. The oil and vapor is preferably passed into the distributor under considerable pressure, and the jets discharged through the orifices B' impinge against the inner wall of the tower at high velocity.

In consequence of the described mode of introducing the oil and vapor into the tower, an initial separation of oil and vapor occurs in the chamber portion A'. From the chamber portion A', which occupies an intermediate portion of the height of the tower, the liberated vapor passes to the vapor outlet chamber $A^2$ at the top of the tower, while the free liquid passes by gravity to the liquid storage space $A^3$ in the bottom of the tower. Interposed between the chambers A' and $A^2$ are means for eliminating oil entrained by the vapor passing upward from the chamber A'. These means in the construction shown, comprise one or more strainers C in the form of beds of material such as broken rock, tile or metal turnings, each carried by a suitably apertured diaphragm or supporting grid D.

Advantageously I supplement the means already described for separating entrained oil from the vapor by a separator F which may be like an ordinary steam separator, and may be located in the chamber $A^2$, but as shown is located outside the tower A, and has its inlet connected to the vapor outlet E from the tower. The separator F comprises a chamber F', generally cylindrical in cross section, in which a spiral retarder G is mounted. The bottom portion of the chamber F' is formed by two lips $F^2$ and $F^3$, the lip $F^3$ being cylindrical and coaxial with the axis of the retarder G, while the lip $F^2$ is outwardly displaced from the periphery of the retarder, so that the oil thrown outward by centrifugal action, as it flows along the spiral path defined by the retarder G, drips from the free edge of the lip $F^2$ into a liquid collecting chamber $F^4$. A return pipe H, looped to provide a liquid seal, passes the oil collecting in the chamber $F^4$ back into the chamber A'.

The oil passing downward by gravity from the chamber A' is acted upon by provisions for liberating oil vapor therefrom. The provisions shown for this purpose comprise a series of conical baffles or spreaders I and $I^A$, the apices of the baffles I being directed downward and the apices of the baffles $I^A$ being directed upward. Each baffle I is provided with a central port I' through which the oil passes from that baffle onto the baffle I^A beneath, and ports I² are provided adjacent the base of each baffle I^A to permit the oil flowing down over each such baffle to pass to lower levels. Each baffle I and I^A is preferably provided with transverse ribs I³ on its upper side which increase the surface of the flowing oil and retard its flow and break up the film-like streams in which the oil flows down over the baffles, thereby giving additional opportunity for the liberation of vapors from the oil. Advantageously, as shown, each baffle I and I^A is formed of cast iron sector-like parts i and i^a, respectively, which can be separately inserted in, and removed from the tower A through a suitable manhole A⁴. Each of the sections i and i^a, as shown, is formed with uprising flange portions i', at its side edges between which extend the corresponding portions of the baffle ribs I³. Adjacent sections i and i^a, respectively, of the baffles I and I^A are connected by bolts i² extending through the corresponding flanges i' as shown in Figs. 3 and 5. The bolts i² are not shown in Fig. 1 because of the small scale of that figure. The baffle sections i and i^a are supported on inclined ribs J which are shown as steel angle bar sections, and are secured at their lower and outer ends to the wall of the tower A, and are connected together at the center of the tower by a central conical plate K^A against which the inner ends of the sections i^a abut. Associated with each baffle I^A are provisions for passing vapor collecting beneath the baffle into the space beneath the baffle I above, without having this vapor coming into direct contact with the descending oil. The provisions shown for this purpose comprise an orifice K' at the apex of the conical plate member K^A and a cast metal cap member K² resting on the plate K^A, and provided with a pipe portion K³ communicating at its lower end with the orifice K', and open at its upper end beneath the adjacent baffle I at one side of the central oil discharge orifice I' in the latter. The oil discharge ports I² at the lower edge of each baffle I^A are formed, in the construction illustrated, by flattening the lower outer edges of the sectors i^a as shown in Fig. 3.

The baffles I may be exactly similar in construction to the baffles I^A, except that the supporting ribs J for the baffles I are downwardly inclined, the conical central member K of the baffles I is inverted with respect to the similar members K^A of the baffles I^A, the baffles I include nothing corresponding to the cap member K² of the baffles I^A, and the upper outer ends of the sections i are rounded to fit snugly against the inner wall of the tower.

Provisions are made for scrubbing the oil flowing down over the baffles with steam which preferably is superheated. For this purpose a circular steam spray pipe L is located within the tower immediately above the lower outer edge of each baffle I^A. Each spray pipe L is connected by a corresponding valve L² to an external steam supply pipe L³. The discharge orifices L' in each spray pipe L, are advantageously located so that the jets discharged sweep up along the corresponding baffle I^A toward the center of the tower. Oil vapor and steam collecting beneath the baffles I, pass through outlet ports M' in the wall of the tower into external piping M which is preferably insulated and returns the vapor to the chamber A' through the port M², at a level above that of the distributor B. The vapor free oil collecting in the storage space A³ at the bottom of the tower, may be drawn off through the pipe O.

In the contemplated use of the apparatus disclosed, an initial separation of liquid and vapor occurs in the tower chamber A'. From the chamber A' the liberated vapor and the oil pass upward and downward, respectively, and are separately treated in separate portions of the tower to eliminate entrained liquid from the vapor, and to liberate vapor from the oil.

The discharge of the oil and vapor mixture through the orifices B' of the distributor B in jets which impinge with considerable force against the inner wall of the tower, and the breaking up of the jets on such impingement, facilitates the liberation in the chamber A' of a considerable portion of the vapor carried into the chamber in the form of entrained bubbles. The vapor thus liberated in the chamber A', and the vapor passed into the chamber from the lower portions of the tower A, through the piping M, passes upward from the chamber A' into the chamber A² through the strainer beds C. These eliminate from the vapor the entrained globules of oil which are ordinarily present in such considerable amount that the vapor is in a fog or mist-like condition. The small residue of entrained oil in the vapor passing out of the tower through the vapor outlet E, is largely eliminated in the separator F and returned to the tower through the return pipe H.

The liquid strained out of the vapor by the strainer beds C drips down through the chamber A' and mingles with the other oil which passes from that chamber down over the baffles I and I^A to the oil storage space A³. As the oil flows in film-like and broken streams over the baffles I and I^A, opportunity is given for the liberation of any vapor in the form of bubbles entrained by the liquid, and for the liberation of vapor formed by evaporation in the course of the travel of the oil.

The discharge of steam through the spray pipes L in jets sweeping over the surface of the film-like streams of oil flowing along the baffles I^A, greatly increases the evaporation of the oil by reducing the vapor tension of the oil at the surface of the oil stream. If the steam is supplied at a temperature above that of the oil, heat imparted by the steam to the oil further augments the evaporation, and the heat supplied by the steam may serve to maintain or even augment the temperature in the tower, but superheated steam sweeping over the surface of the film-like streams of oil will reduce the vapor tension of the oil and increase its evaporation even though the steam is supplied at a temperature below that of the oil and acts as a cooling agent. In some cases it may be desirable to supply the steam at or below, rather than above, the temperature of the oil to avoid cracking conditions in the tower in which the relatively slow movement of the oil and liberated vapors is favorable to the development of cracking conditions. The scrubbing action of the steam jets on the surface of the oil streams facilitates the liberation of entrained bubbles of vapor.

Preferably the steam passed into the separating tower through the spray pipes is highly superheated as this makes it possible to obtain the desired vapor tension reducing and scrubbing effects with a substantially smaller weight of steam than would be required if saturated steam were employed. This correspondingly and substantially reduces the duty required from the condenser, not shown, into which the oil vapors and steam pass from the separator, especially as the latent heat in a pound of steam is much greater than the latent heat in a pound of oil vapor. An ample supply of sufficiently superheated steam may readily be obtained in plants in which my improved separators are ordinarily employed, by the use of radiant heat superheaters in the furnace chambers of the stills or oil heaters. The vapor liberated in the various portions of the tower below the uppermost baffle I is drawn out of the tower through the piping M and returned to the chamber A' above the level of the distributor B without again coming in contact with and thereby being entrained in part by the descending oil. With the described tray arrangement, the descending oil is kept largely out of contact with the outer wall of the tower thus reducing the heat losses from the tower. The baffle construction, moreover, possesses important practical advantages from the mechanical standpoint and the ease with which the baffles can be assembled.

The fact that the discharge of the oil through the distributor orifices B' in the high velocity jets, puts some back pressure on the pipe B is not objectionable. Owing to the large portion of the oil converted into vapor in the stills or heaters, amounting to 90 or 95% of the oil in some topping operations, and the high velocity at which the oil and vapor mixture passes through the stills and discharge pipe B, there is a substantial frictional resistance to the flow of oil and vapor mixture. The effect of back pressure is to contract the oil vapor bubbles in the stream of oil, thereby tending to reduce the frictional resistance, and in practice a considerable variation in the back pressure on the discharge end of the pipe B can occur without causing an appreciable difference in the pressure required at the inlets to the stills or heaters.

While in accordance with the provisions of the statutes, I have illustrated and described the best form of my invention now known to me, it will be apparent to those skilled in the art that many changes may be made in the form of the apparatus disclosed without departing from the spirit of my invention as set forth in the appended claims, and that certain features of my invention may sometimes be used with advantage without a corresponding use of other features.

Having now described my invention, what I claim as new and desire to secure by Letters Patent, is:

1. The method of separating oil and vapor from a hot mixture of oil and vapor which consists in effecting an initial separation of the oil and vapor by passing the mixture into a portion of a closed chamber intermediate the top and bottom of the latter in rapidly flowing jets which impinge against surfaces within said chamber portion and are thereby broken up liberating a portion of the vapor, passing the oil from said broken jets in film-like and broken streams through a lower portion of said chamber, collecting the vapor liberated from said streams and mixing it, without contact with the descending oil, with the vapor initially liberated in said chamber, and treating the vapor mixture in the upper portion of said chamber to eliminate entrained oil.

2. The method of separating oil and vapor from a hot mixture of oil and vapor which consists in effecting an initial separation of the oil and vapor by passing the mixture into a portion of a closed chamber intermediate the top and bottom of the latter in rapidly flowing jets which impinge against surfaces within said chamber portion and are thereby broken up liberating a portion of the vapor, passing the oil from said broken jets in film-like and broken streams through a lower portion of said chamber, injecting superheated steam into said chamber so as to sweep the surfaces of said streams, collecting the vapors liberated from said streams and the steam, and mixing them without contact with the descending oil, with the vapors initially liberated in said chamber and treating the vapor mixture in the upper portion of said chamber to eliminate entrained oil.

3. Apparatus for separating vapor from liquid comprising a separating tower provided with a liquid and vapor inlet chamber intermediate its top and bottom and provided with a vapor outlet at its upper end and a liquid outlet at its lower end, means in the upper portion of the tower for eliminating entrained liquid from the vapor passing from said inlet chamber to said vapor outlet, means located in the tower below said chamber for causing the liquid to pass downward from said chamber in film-like and broken streams, means connected to one of said last mentioned means for passing vapor liberated in the lower portion of said tower to vapor collecting spaces therein, and means opening to said vapor collecting spaces for passing the liberated vapor to said vapor outlet without appreciable contact with the liquid descending from said chamber.

4. Apparatus for separating vapor from a liquid comprising a separating tower provided with a liquid and vapor inlet chamber intermediate its top and bottom and with a vapor outlet at its upper end and with a liquid outlet at its lower end, means for discharging the mixture into said chamber in radial jets which impinge against its outer wall, means in the upper portion of the tower for eliminating entrained liquid from the vapor passing from said inlet chamber to said vapor outlet, and means within the tower below said chamber for causing the liquid passing down from the latter to flow in film-like and broken streams comprising baffles having a series of transverse ribs theron.

5. Apparatus for separating vapor from a liquid comprising a separating tower provided with a liquid and vapor inlet chamber intermediate its top and bottom, and provided with a vapor outlet at its upper end and with a liquid outlet at its lower end, means in the upper portion of the tower for eliminating entrained liquid from the vapor passing from said inlet chamber to said vapor outlet, means within the tower below said chamber for causing the liquid passing down from the latter to flow in film-like and broken streams, and a distributor centrally located in said chamber and comprising a chambered member formed with discharge orifices through which the liquid and vapor mixture is discharged in jets which impinge against the outer wall of said chamber.

6. Apparatus for separating vapor from a liquid comprising a separating tower provided with a liquid and vapor inlet chamber intermediate its top and bottom and with a vapor outlet at the top of the tower and an oil outlet at the bottom of the tower, a series of alternately inverted baffles of conical form in the tower beneath said chamber, each of the baffles having its base uppermost making a gas tight joint with the wall of the tower, whereby a gas pocket is formed beneath such baffle, and being formed with an orifice at its apex, while each of the baffles having its apex uppermost is adapted to discharge the liquid flowing over it adjacent the wall of the tower, means carried by each of the last mentioned baffles for passing the vapor collected immediately below its apex into the gas pocket beneath the baffle immediately above without coming into contact with liquid passing through the central orifice in the last mentioned baffle, and means for passing vapor from said pockets into the upper portion of the inlet chamber.

7. In liquid and vapor separating apparatus, a conical liquid spreading baffle consisting of a plurality of substantially flat sector-shaped metallic sections rigidly connected together, each of said sections having flow obstructing devices mounted thereon.

8. In liquid and vapor separating apparatus, a conical liquid spreading baffle consisting of a plurality of substantially flat sector-shaped metallic sections, means for obstructing the flow of liquid on the upper face of each of said sections, flanges at the side edges of each section and means rigidly connecting the adjacent flanged edges of adjacent sections.

9. In liquid and vapor separating apparatus, a conical liquid spreading baffle consisting of sector-shaped metallic sections of cast iron each provided with flanges at its side edges and transverse ribs connecting said flanges.

10. The combination with a vertically disposed cylindrical casing, of a conical liquid spreading baffle therein consisting of sector-shaped elements and supporting means for said sections consisting of structural elements each secured at one end to the casing and extending from the latter inward toward the axis of the casing at an inclination to the latter and an apertured central member to which the inner ends of said elements are connected.

11. In liquid and vapor separating apparatus, a conical liquid spreading baffle provided with a vapor outlet from the space beneath the baffle in the form of a pipe extending away from the apex of the baffle upwardly and outwardly from the axis of the baffle.

12. Apparatus for separating vapor from a liquid comprising a vertically disposed cylindrical tower, a liquid spreading baffle in the form of an inverted cone, with an orifice at its apex and making a gas tight joint with the casting at its base, and a second baffle beneath the first mentioned baffle and in the form of a cone and adapted to permit liquid to flow over it adjacent its base and provided with an outwardly and upwardly inclined vapor pipe at its apex forming an outlet for vapor collecting within the second named baffle and opening in the space beneath the first mentioned baffle at one side of the said orifice therein.

13. In an oil and vapor separating chamber having a hot oil inlet, an oil outlet, a vapor outlet, and means for spreading the oil into a film-like stream as it passes down from said oil inlet, and means arranged for sweeping the surface of said film-like stream with jets of steam.

14. In a liquid and vapor separating chamber having a hot liquid inlet, a liquid outlet, a vapor outlet, and a conical baffle over which the liquid flows in a film-like stream, the improvement which consists in a circular steam spray pipe surrounding said baffle adjacent its base and having orifices discharging jets of steam along the surface of the baffle toward its apex.

Signed at New York city, in the county of New York and State of New York, this 4th day of May, A. D. 1923.

JOHN PRIMROSE.